United States Patent [19]

Selzer

[11] Patent Number: 4,687,224
[45] Date of Patent: Aug. 18, 1987

[54] DUAL OFFSET CANTILEVERED SPRING SUSPENSION

[75] Inventor: Robert J. Selzer, Fort Wayne, Ind.

[73] Assignee: Navistar International Corporation, Chicago, Ill.

[21] Appl. No.: 745,396

[22] Filed: Jun. 14, 1985

[51] Int. Cl.$^4$ .................... B60G 11/04; B60G 19/02
[52] U.S. Cl. .................... 280/718; 267/41; 267/45; 267/36.1; 280/699
[58] Field of Search ............ 280/669, 718, 680, 720, 280/699, 719; 267/54 A, 54 R, 56, 36 R, 22 R, 44, 47, 45, 46, 38, 7, 52, 158, 41, 162

[56] References Cited

U.S. PATENT DOCUMENTS

| Re. 15,586 | 5/1923 | Cooke | 267/36 R |
|---|---|---|---|
| 1,183,320 | 5/1916 | Prescott | 267/41 |
| 1,389,839 | 9/1921 | Neale | 267/36 R |
| 1,423,153 | 7/1922 | Richardson | 267/36 R |
| 1,557,237 | 10/1925 | Bobo | 267/45 |
| 1,744,489 | 1/1930 | Moomaw | 267/41 |
| 2,012,752 | 8/1935 | Buquor | 280/680 |
| 2,632,639 | 3/1953 | Proske | 267/54 A |
| 2,953,392 | 9/1960 | Haley | 280/718 |
| 3,490,758 | 1/1970 | Foster | 280/720 |
| 3,580,347 | 5/1971 | McGee | 280/718 |
| 4,061,364 | 12/1977 | Parks | 280/669 |
| 4,553,774 | 11/1985 | Malcolm | 280/669 |

Primary Examiner—Richard A. Bertsch
Attorney, Agent, or Firm—F. David AuBuchon; Dennis K. Sullivan

[57] ABSTRACT

A vehicle suspension system is provided with dual offset cantilevered leaf springs. A forward and a rearward extending leaf spring are both mounted to a vehicle axle in a longitudinally overlapping transversely offset manner. The forward and rearward springs are also connected at their extended ends to a structural frame member of the vehicle. The longitudinally overlapped mounting of forward and rearward extending springs allows the deflection per given load of the suspension system to be increased while at the same time minimizing the overall length of the spring suspension system. The transverse offset of the spring may provide for a decreased turning radius by allowing greater clearance between the wheel and suspension system.

6 Claims, 2 Drawing Figures

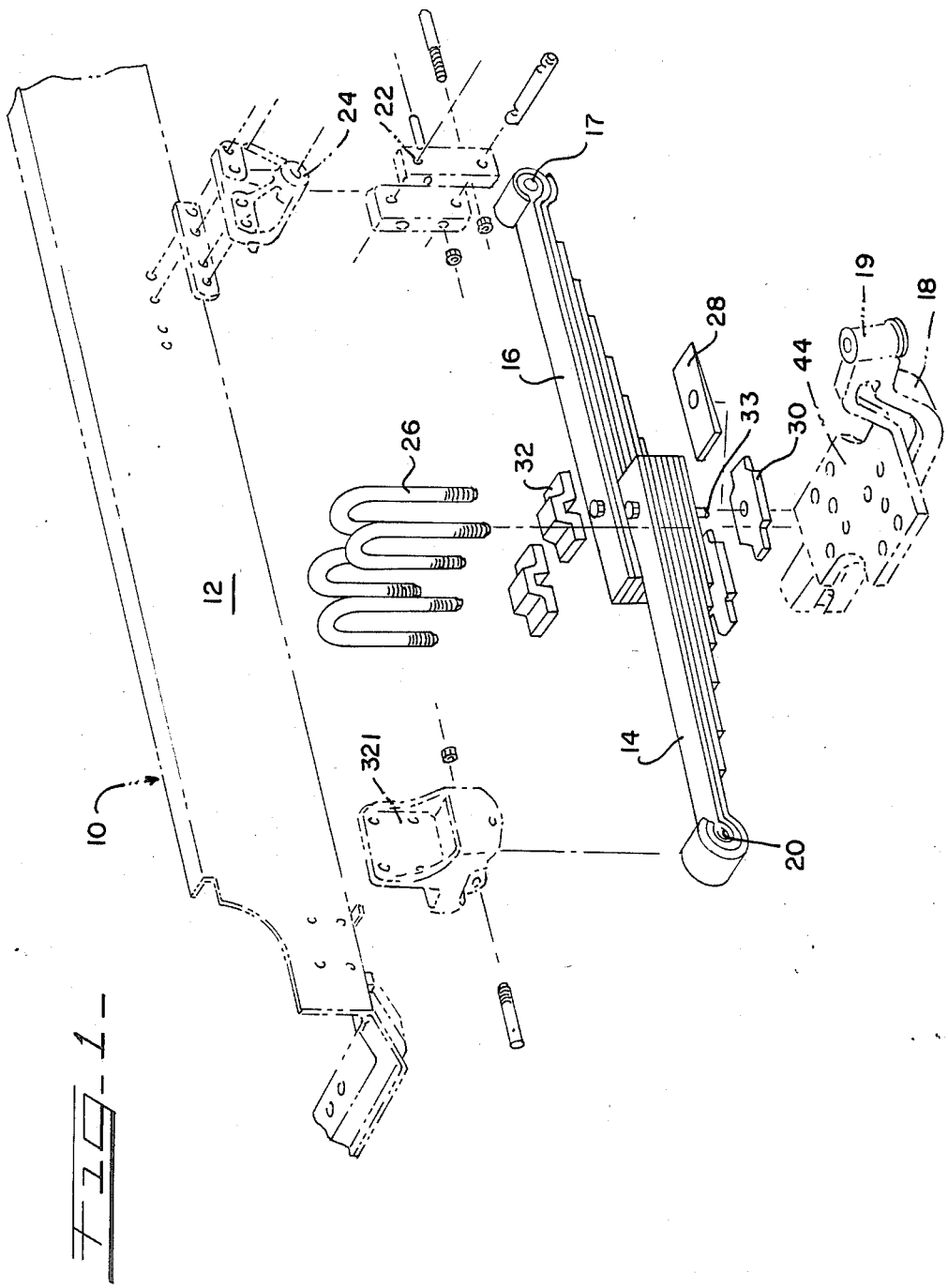

DUAL OFFSET CANTILEVERED SPRING SUSPENSION

BACKGROUND OF THE INVENTION

The field of the present invention is that of vehicle suspension systems. More particularly, the field of the present invention is that of cantilevered leaf spring suspension systems for trucks and like motor vehicles.

DISCLOSURE STATEMENTS

Motor vehicles such as trucks often have leaf spring suspension systems. In the leaf spring suspension system, the leaf spring is usually mounted to a vehicle axle approximately along the leaf spring's mid point. The opposite ends of the leaf spring are then attached to the vehicle's frame.

To optimize operator comfort, the suspension system leaf spring utilized should be as long as possible. A longer leaf spring provides an increased amount of deflection for a given load and thereby provides a less stiff spring (i.e. suspension system), thereby giving the vehicle operator a softer ride. However, the leaf spring length is limited by the shape of the vehicle frame (rails), overall vehicle dimensions, and by the need for clearance between the tire and the suspension system on the front axle of the truck. Having a truck rear axle suspension system with a leaf spring as short as possible is desirable from the standpoint of the trailer dimensions of trailers which extends beneath the rail level of the truck, such as a beverage, glass, or moving van trailer. Also, by using a shorter spring, the rails of the truck can be straight channel members and will not have to be bent to accommodate a longer spring.

SUMMARY OF THE INVENTION

To overcome the disadvantages of prior leaf spring suspension systems the present invention is brought forth. The present invention is a leaf spring motor vehicle suspension system which utilizes offset dual cantilevered leaf springs. Both springs are mounted to the transverse vehicle axle. One spring extends forwardly to connect with the vehicle frame. The second spring projects rearwardly to connect with the vehicle frame. The longitudinal overlapping of the forward projecting and rearward projecting leaf springs allows the suspension system to have the operational characteristics (increased deflection for a given load) heretofore only achieved in leaf spring suspension systems utilizing leaf springs of greater length, while at the same time fitting in a much shorter space.

Using the dual offset cantilever spring suspension systems also allows for a better match between the front and rear suspension of a truck thus lessening the pitch of a tractor cab. Also, the use of the dual offset cantilevered spring system suspension on the front axle allows for increased clearance between the suspension system and the vehicle wheel, thereby allowing for a larger turning angle. The dual offset cantilevered spring suspension system also allows for a flatter spring geometery.

It is a desire of the present invention to provide a motor vehicle leaf spring suspension system which utilizes dual cantilevered offset leaf springs to provide a suspension system which performs closely to single leaf spring suspension systems wherein the single leaf spring suspension system has an overall linear length in excess of the total linear length of the dual cantilevered offset leaf spring suspension system.

Other desires and advantages of the present invention will become apparent to those skilled in the art as the nature of the invention is better understood from the accompanying drawings and detailed description.

BRIEF DESCRIPTION OF THE DRAWINGS

FIG. 1 is a perspective exploded view of the suspension system of the present invention;

FIG. 2 is a partial perspective exploded view of the suspension system of the present invention utilizing tapered leaf springs.

DETAILED DESCRIPTION OF THE DRAWINGS

Referring to FIG. 1, the inventive motor vehicle suspension system 10 has three major components, a forward extending leaf spring 14, a rearward extending leaf spring 16, and an axle 18 which extends transversely to a vehicle frame 12. Axle 18 may be, as illustrated, a dead (nonrotating) axle or a live axle mounted by a bearing block. Axle 18 at its end 19 is connected to a wheel mount which for clarity of illustration has been deleted. Additionally, axle 18 has a mounting plate 44 to provide support for the mounting of the leaf springs 14 and 16.

Forwardly extending leaf spring 14 is a multi-leaf straight type leaf spring and also has eyelet 20 which facilitates the attachment of the leaf spring 14 to the frame member 12 via attachment piece 32. Leaf spring 14 is captured by a pair of U-bolts 26 which extend downward to the mounting plate 44. Retaining clamp 32 covers a spring retaining bolt 33. Shim member 28 and a wear plate 30 is utilized to make adjustments and/or to project spring 14 in a given desired angle as spring 14 extends towards the frame 12.

Longitudinally overlapping forward extending cantilevered spring 14 is rearward extending cantilevered leaf spring 16 which is transversely offset along the axle 18. Rearward extending leaf spring 16 also has an eyelet 17 at its extended end which is coupled to shackle 22. Shackle 22 is pivotally connected with the frame 12 via the shackle pivot 24. Shackle pivot 24 is fixably attached to frame member 12.

Because of the transverse overlapping of the forward and rearward extending leaf springs 14 and 16, the total linear length of the suspension system 10 is shortened.

When braking, the rearward spring 16 has greater loading than the forward spring 14 due to the torque reaction of the axle. To counter the axle torque reaction, rearward spring 16 may have a spring rate (force required for a given deflection) which is higher than forward spring 14. In other applications it is desirable for the spring rate of the forward and rearward springs to differ to prevent vehicle pitch due to acceleration forces.

As will be obvious to those skilled in the art when the motor vehicle has two transversely separated wheels mounted to axle 18, the motor vehicle will have on its other side a suspension system identical as that illustrated in FIG. 1. For clarity of illustration, suspension system on the side of axle 18 opposite end 19 has been deleted.

When utilizing the inventive suspension system on the front axle of a truck, the rearward extending spring 16 is positioned inwardly of the forward extending spring 14 from the wheel. This transverse offset of the springs allows greater clearance between the tire (not shown) and the suspension system 10, thereby allowing the use of an increased turning angle for the motor vehicle.

Another advantage of the present invention is to allow more refined tuning of the front and rear suspensions. To eliminate possible pitch when the truck hits an obstruction, the deflection of the front and rear suspensions should be evenly matched. In situations where the rear suspension spring length is severely limited, the longitudinal overlapping of the forward and rearward extending springs allows the rear suspension springs to be more evenly matched with the front suspension springs. Therefore when going over an obstruction, the vehicle operator feels an up and down motion and is not rocked forward or rearward by the pitch of the vehicle.

Referring to FIG. 2 the suspension system 34 has a forwardly extending cantilevered leaf spring 38 and a rearwardly extending cantilevered leaf spring 36. The partially shown vehicle axle 40 has mounting plates 42 facilitating the mounting of the cantilevered leaf springs 38 and 36. The cantilevered leaf springs are held down by U-bolts 46 which capture retaining member 48 to aid in the mounting of the cantilevered leaf springs. The cantilevered leaf springs illustrated in FIG. 2 are both tapered semi-elliptical in free state type springs which usually offer the advantages of similar straight type leaf springs, while having less weight.

While a few embodiments of the present invention have been explained, it will be readily apparent to those skilled in the art that other modifications can be made to the present invention such as allowing one of the cantilevered leaf springs, typically the rearward extending spring, to rest against a cam member which is attached to the vehicle frame. This cam member mounting allows the cantilevered leaf spring to have a variable spring constant by providing a variation in overall spring length as the spring is moved from its static position. It is also apparent that other modifications can be made to the present invention without departing from the spirit and scope of this application as encompassed by the following claims.

What is claimed is:

1. A truck frame suspension system comprising:
   an axle positioned transversely to said frame, said axle having a pair of mounting plates disposed adjacently transversely near an end thereof;
   a first leaf spring having a first end mounted as a cantilever to one of said pair of mounting plates and extending in a first direction to a distal end attached to the truck frame; and
   a second leaf spring having one end mounted as a cantilever to the other of said pair of mounting plates and extending in a second direction opposite of the first direction to an opposite end attached to the truck frame, said second leaf spring longitudinally overlapping said first leaf spring and being transversely offset therefrom.

2. A vehicle frame suspension system as described in claim 1 further including said first spring having an eyelet at the distal end thereof.

3. A vehicle frame suspension system as described in claim 1 further including a shackle being pivotally attached to said frame and said opposite end of second spring being attached to said shackle.

4. A vehicle frame suspension system as described in claim 1 wherein said first spring has a spring rate which differs from the spring rate of said second spring.

5. A vehicle frame suspension system as described in claim 1 wherein said first spring is semi-elliptical in its free state.

6. A vehicle frame suspension system as described in claim 1 wherein said second spring is a tapered leaf spring.

* * * * *